A. P. LEE.
CONVERTIBLE TRAILER.
APPLICATION FILED APR. 28, 1919.
1,376,443.
Patented May 3, 1921.
6 SHEETS—SHEET 4.
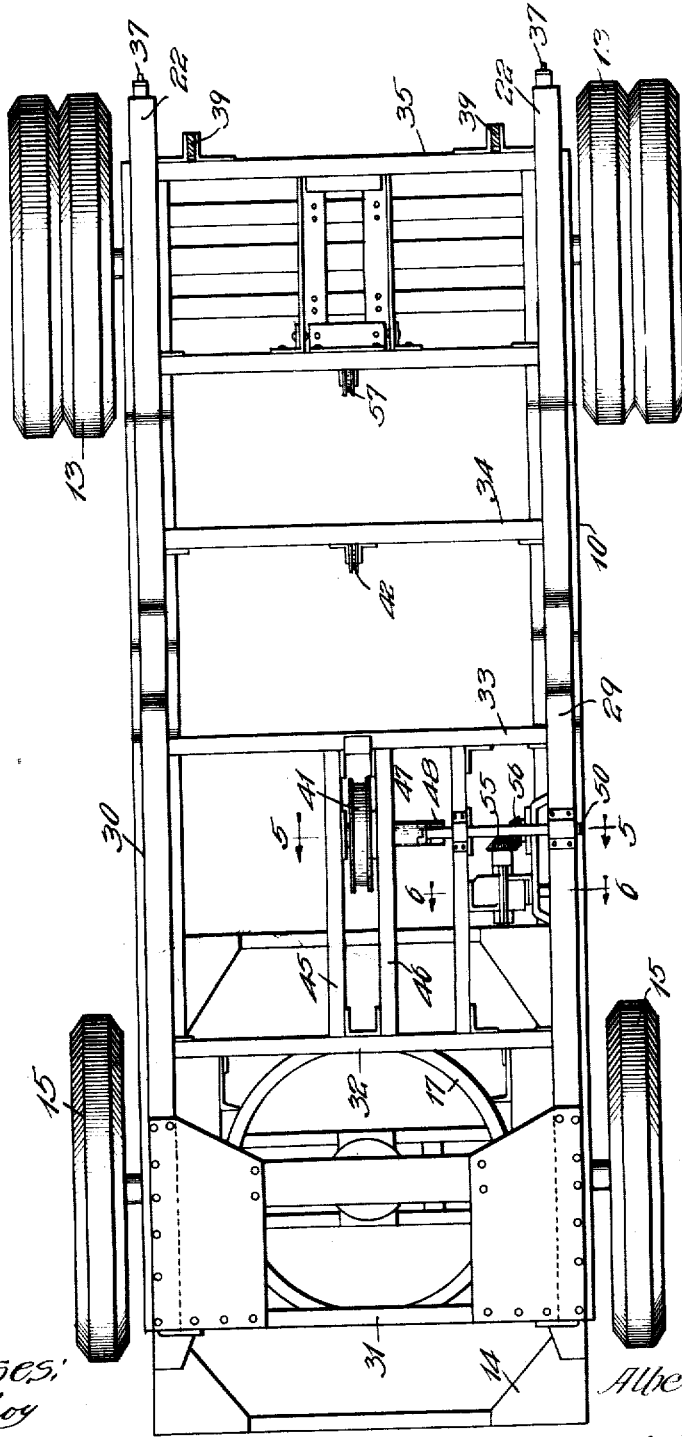

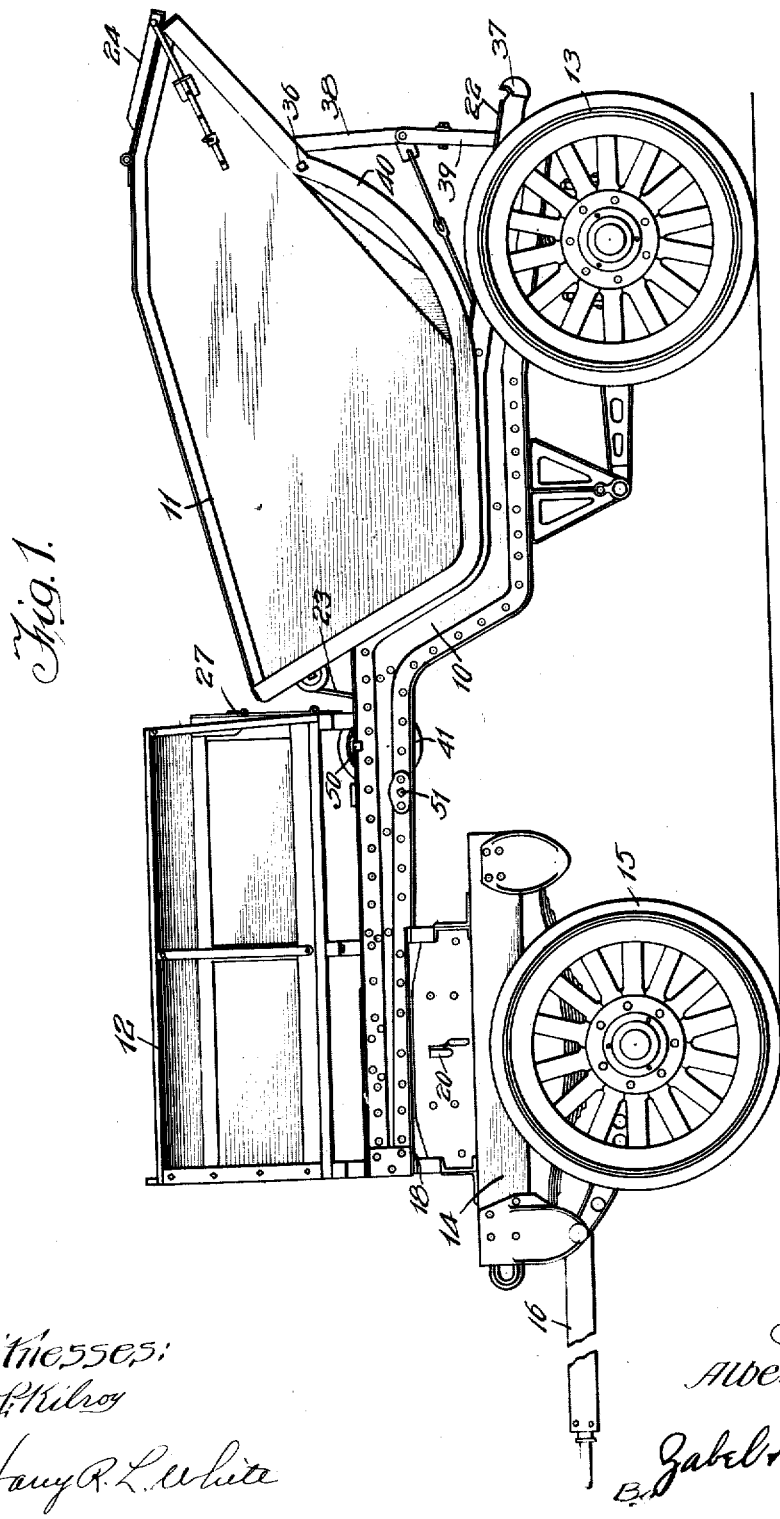

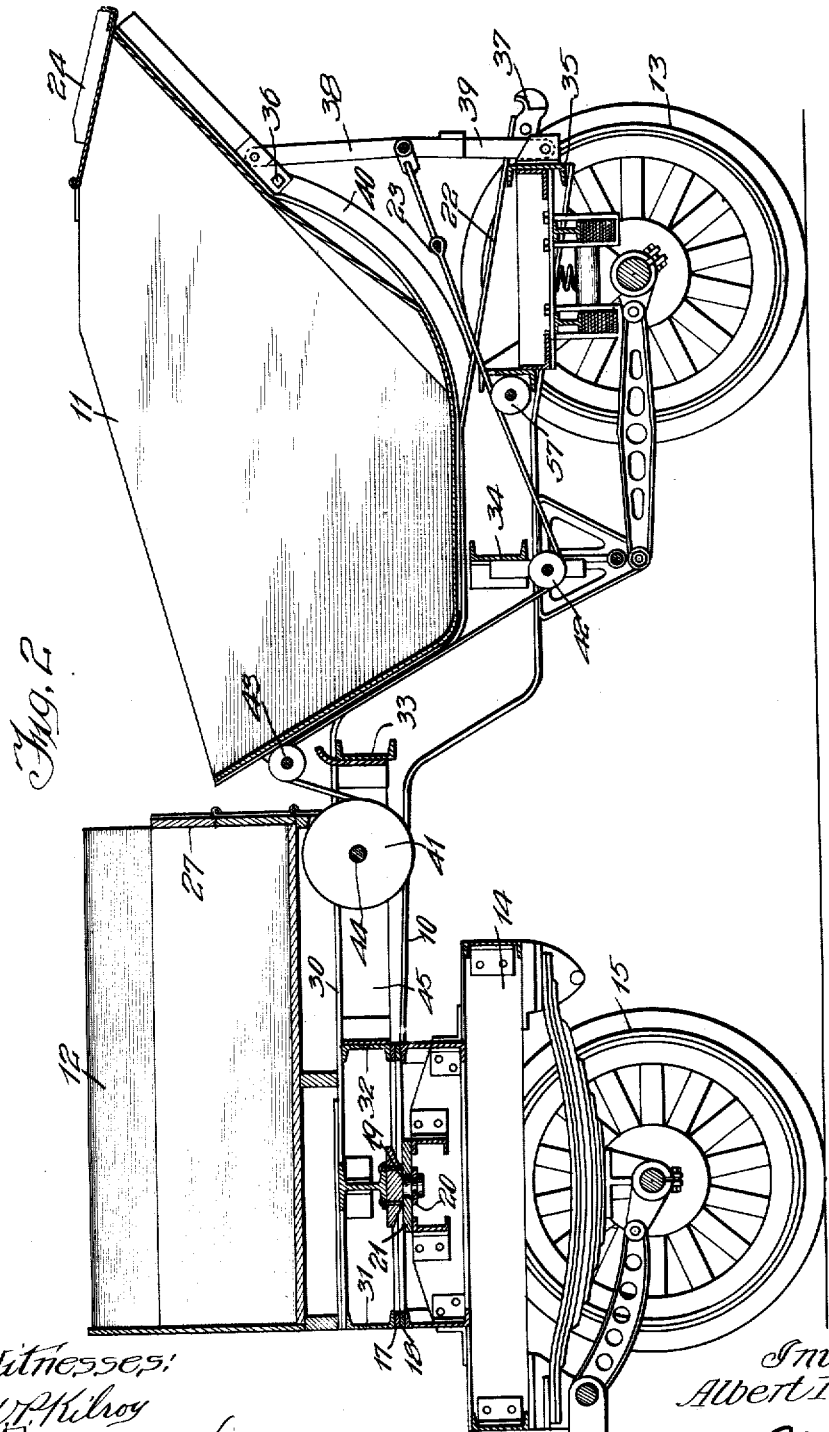

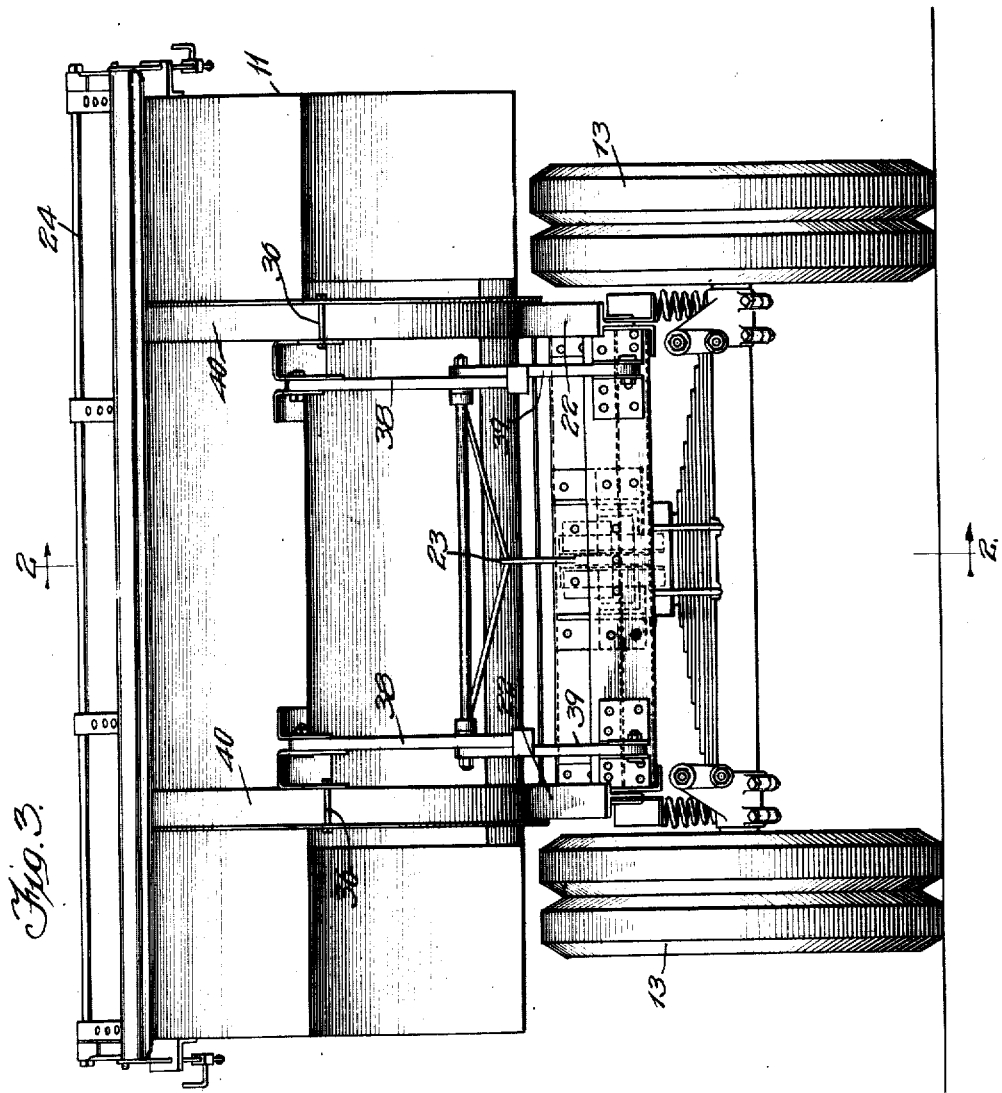

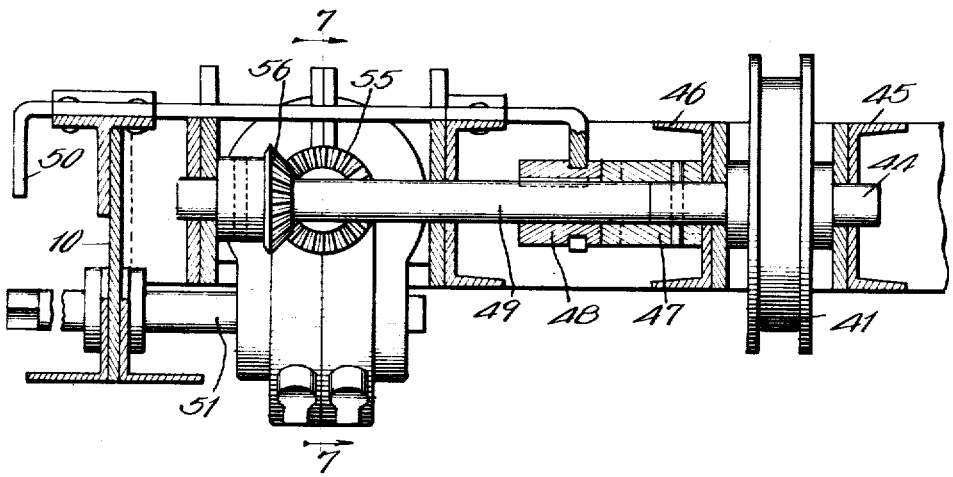
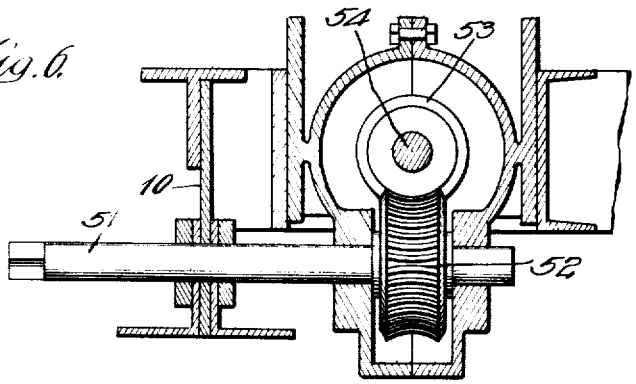
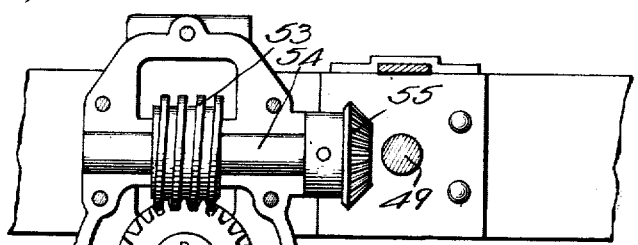

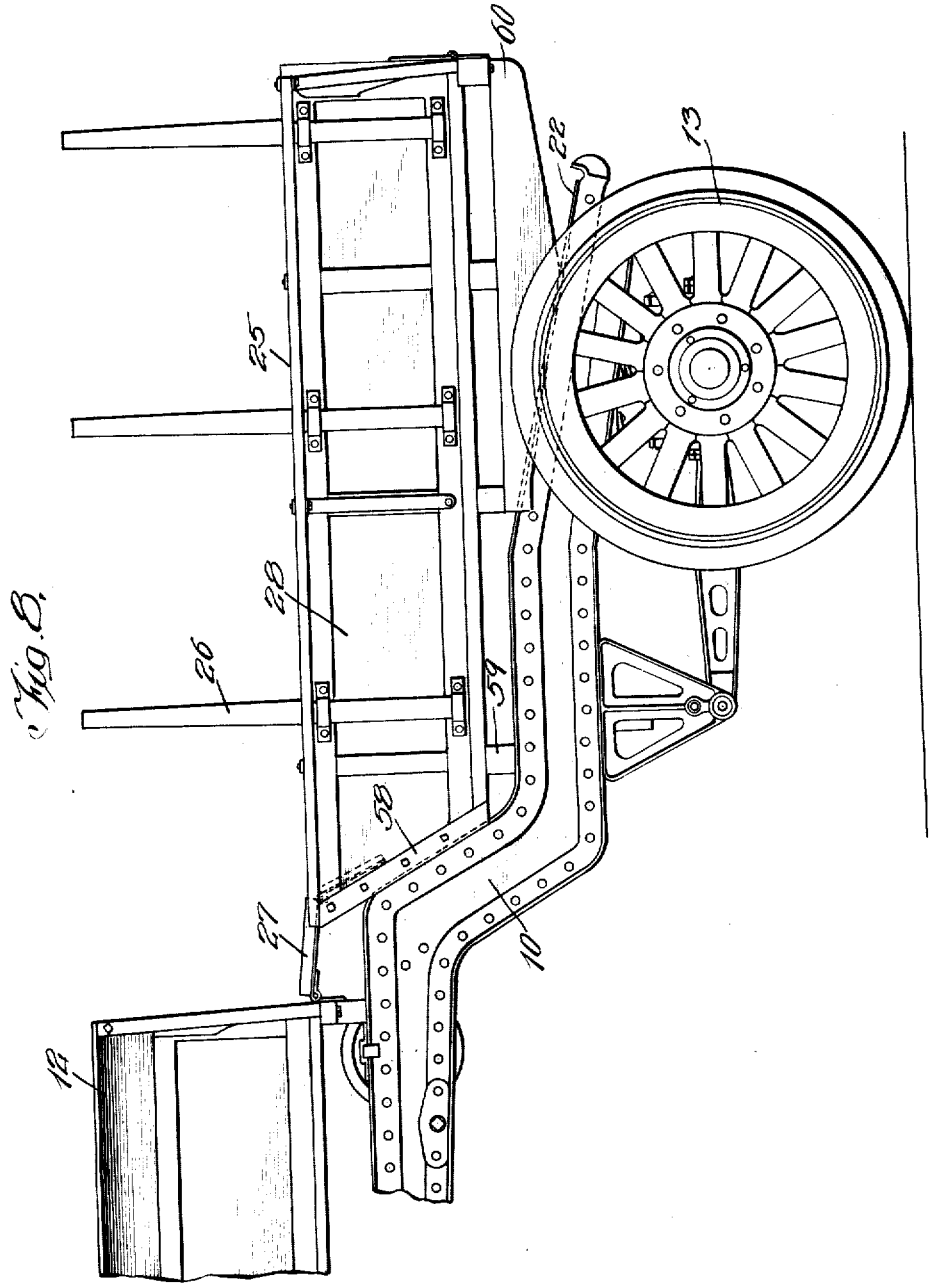

UNITED STATES PATENT OFFICE.

ALBERT P. LEE, OF CHICAGO, ILLINOIS, ASSIGNOR TO LEE LOADER & BODY COMPANY, OF CHICAGO, ILLINOIS.

CONVERTIBLE TRAILER.

1,376,443.  Specification of Letters Patent.  Patented May 3, 1921.

Application filed April 28, 1919. Serial No. 293,202.

*To all whom it may concern:*

Be it known that I, ALBERT P. LEE, a citizen of the United States, residing at Chicago, in the county of Cook and State of Illinois, have invented a certain new and useful Improvement in Convertible Trailers, of which the following is a full, clear, concise, and exact description, reference being had to the accompanying drawings, forming a part of this specification.

My invention relates to trailers and has among its objects the production of a trailer structure so arranged that in one of its forms it constitutes a four-wheeled trailer and when converted constitutes a semi-trailer capable of mounting upon the rear portion of a truck.

My invention in one of its forms utilizes a drop frame structure for purposes which will appear hereinafter. My invention further contemplates a particular style of rear dumping hopper, together with means for controlling the dumping operations of the hopper and holding the hopper in any given desired position.

My invention further contemplates the arrangement of a dumping hopper in such a manner that it can be used for road spreading purposes.

My invention furthermore in one of its forms contemplates a structure having a framework of such a nature that it can properly accommodate a dumping hopper and at the same time can accommodate a wagon body.

My invention furthermore contemplates a framework of such a character that when arranged in a given manner it can accommodate the dumping hopper aforesaid and when differently arranged constitutes what is called an express body or a body of the ordinary square permanent type.

I will explain my invention more in detail by referring to the accompanying drawings, in which—

Figure 1 is a side view of a trailer constructed in accordance with my invention;

Fig. 2 is a longitudinal sectional view thereof on line 2—2 of Fig. 3;

Fig. 3 is a rear view thereof;

Fig. 4 is a top view thereof, the bodies being removed;

Fig. 5 is a sectional view of certain control mechanism on line 5—5 of Fig. 4;

Fig. 6 is a fragmentary sectional view on line 6—6 of Fig. 4;

Fig. 7 is a sectional view on line 7—7 of Fig. 5, and

Fig. 8 is a fragmentary view similar to Fig. 1 showing the dumping body as displaced by an express type body.

Referring more particularly to Fig. 1, I show a trailer framework 10 which, as can be seen, is of the drop frame type, that portion of the frame which is lowered supporting a rear dump hopper 11. An ordinary rectangular wagon body 12 is shown mounted upon the front end of the framework 10. Suitable rear wheels 13 support the rear of the framework and the front end of the framework is, through the interposition of a turn table or fifth wheel structure, mounted upon a two wheel truck structure in such manner that its connection between the front end of the framework 10 and the truck structure 14 can be readily accomplished and the coöperating fifth wheel structure of the framework 10 mounted upon the rear of a hauling truck. The convertible nature of my structure will thus be readily apparent in that it may be used as a semi-trailer having the rear wheels 13, the front extremity of the framework 10 being rotatably mounted upon the rear of a draft truck or the truck structure 14 may be mounted below the front end of the framework 10 and the device then constitutes an ordinary four-wheel trailer, in which condition it is shown in Fig. 1. The truck structure 14 has the wheels 15 and the draw bar 16. Suitable springs are interposed between the wheels and the framework 10, as readily apparent from the figures. The disconnectible or demountable fifth wheel structure which is interposed between the framework 10 and the truck structure 14 is more clearly apparent from an inspection of Fig. 2 where the two coöperating and circular fifth-wheel elements 17 and 18 are shown, the element 17 being mounted upon the framework 10 and the element 18 upon the truck structure 14. The rings 17 and 18 are slidable one upon the other so that the truck structure 14 may pivot relatively to the structure 10. A king bolt 19 is provided and this is removably held in place by the forked retaining element 20. The king bolt is fixedly mounted upon the framework 10 and finds bearing in a bearing plate 21 carried by the truck structure 14. It will thus be apparent that in order to separate the truck structure 14 from the framework 10 it is necessary to withdraw the forked element 20 whereupon the front end of the framework 10 may be raised and the truck structure 14 withdrawn from underneath.

By referring again to Fig. 1, it will be noted that the dumping hopper 11 is of the rear dump variety and is so arranged as will be presently explained that it can roll down a runway 22 to its discharge position, suitable means including the cable 23 being provided to permit of this descent rather rapidly, or in a predetermined slow manner by easy stages. The hopper is provided with an adjustable cover plate 24 for the snout so that it can serve for road spreading purposes. When used for road work the small body portion 12 can carry tools as may be desired.

To indicate further the convertible nature of the structure reference is had to Fig. 8 where the dumping hopper 11 is displaced by a body structure having the floor 25 which is preferably even with the floor of the body portion 12. Suitable struts 26 are provided and in fact entirely closed sides may be provided for this auxiliary body, as may be desired. The body portion 12 has a hinged sectional rear door 27 which is normally closed, as shown in Fig. 1, but which when the structure is converted is laid in a horizontal manner, as shown more clearly in Fig. 8, so as to provide a continuous floor, that is, the floor 25 together with a portion of the door 27 and the floor of the body portion 12 form a continuous substantially even surface. The hollow space 28 beneath the floor portion 25 can also be suitably utilized for carrying purposes, as may be desired.

When the body is such as shown in Fig. 8, it is what is called the express type. Having thus explained the general nature of the device, the details will now be more clearly set forth.

The framework 10 consists of the side bars 29 and 30, suitably held together at their ends and intermediately by angle iron cross-pieces 31, 32, 33, 34 and 35, thus making a very rigid and substantial structure. A portion of this framework 10 is constructed in the form of a rail 22, as shown more clearly in Figs. 1, 2, 4 and 8, thus forming two rails upon which the dumping hopper 11 may roll from its charge carrying position shown in Fig. 1 to a discharge position in which the pins 36 pivot in the fingers 37 provided upon the extremities of the rail 22. The structure which controls the position of the hopper consists of a pair of links 38 and 39, the link 39 being pivoted upon the framework 10 at one extremity thereof and the link 38 being pivoted at one extremity upon the hopper 11. The other extremities of said links are then pivoted together and under the control of a cord 23.

Primarily it should also be noted that the hopper 11 has a circular rail 40 forming part of its outer contour which coöperates with the rails or runways 22. The cord 23 has its free extremities controlled by a sheave 41 about which said sheave the cord is wound. The cord extends around an idler pulley 42 shown more clearly in Fig. 2 and then around an idler pulley 43 pivotally carried upon the wall of the hopper 11. Assume now that the left hand extremity of the rope (Fig. 2) is released. Then the hopper which is overweighted toward the rear rolls of its own motion downwardly into its limiting dumping position, the weight of the hopper being sufficient to cause the links 38 and 39 to swing to the rear as these links are at no time moved into a straight line position by the cord 23. Instrumentalities are provided, however, for so controlling the extremity of the rope 23 that it may unwind slowly from the sheave 41, thus absolutely controlling the descent of the hopper and holding it in any desired position. Under these conditions the trap door 24 near the discharge mouth of the hopper may be open any desirable distance so as to permit the contents of the hopper to be spread evenly over the road as the trailer is being moved forwardly. After the hopper 11 is dumped, it can be restored to its charge carrying position of Fig. 1 by winding up the extremity of the rope 23 upon the pulley 41 and thereupon the hopper is drawn into its original position. The rope draws the links 38 and 39 into the position of Fig. 1 and at the same time tilts the hopper contra-clockwise by reason of the engagement between the rope and the pulley 43.

It will be noted that a very substantial flat floor portion is provided upon which the hopper rests when in its charge carrying position. Furthermore, the front wall of the hopper is inclined and rests upon the inclined portion of the framework 10 so that the hopper is held in a very secure position.

By referring more particularly to Figs. 4, 5, 6 and 7, the control structure for the rope 23 will be apparent. The pulley 41 is mounted upon a shaft 44 pivotally carried in cross-pieces 45 and 46 secured to the framework 10, this shaft having at its extremity one element 47 of a clutch structure. The second element 48 of this clutch structure is splined and slidable upon a shaft 49 and controlled by means of the fingerpiece 50. Thus, when the fingerpiece is in the position shown in Fig. 5, the two clutch elements are in operative engagement and the shafts 44 and 49 rotate together. If the fingerpiece 50 is moved to the left, thus disengaging the clutch elements 47 and 48, then there is no longer any connection between the shafts 44 and 49 and they may rotate independently. Assume that the rope 23 is entirely wound upon the pulley 41, then if the finger piece 50 is drawn to the left, disengaging clutch elements 47 and 48, then the hopper 11 may roll down to its discharge position, there being nothing to retard its progress. Whenever the clutch elements 47 and 48 are in engagement, however, then the position of the hopper 11 is controlled by the operations of the shaft 51, which shaft is controllable through the agency of any suitable handle, as may be desired. The shaft 51 carries a worm wheel 52 which coöperates with a worm 53, the worm 53 being mounted upon a shaft 54, which shaft also carries the bevel gear 55. The bevel gear 55 meshes with a bevel gear 56 fixedly secured to the shaft 49. It will thus be noted that as the shaft 51 is turned, it turns the shaft 49 and thus controls absolutely the position of the rope in connection with the pulley 41 and thereby controls the position of the hopper 11. The worm and worm wheel connection between the shaft 51 and shaft 49 constitutes a locking connection so that the shaft 49 even though it has a tendency to rotate due to the pull of the rope 23 upon the pulley 41 cannot rotate the shaft 51. It will be noted that another idler pulley 57 is provided, as shown more clearly in Fig. 2, together with the rope 23.

Referring more particularly to Fig. 8, I show in this figure an auxiliary body structure consisting of the framework 58 which can be suitably bolted to the framework 10 when the dumping hopper 11 is removed. For this purpose suitable filler structures 59 and 60 are provided, more particularly to hold the auxiliary body structure in position. As already explained, the floor 25 of this auxiliary body preferably alines itself with the floor of the body structure 12, thus to make one continuous flat express body.

From what has been thus described the nature of my invention will be readily apparent and it will also be apparent that many modifications may be made within the scope of the appended claims.

Having however thus described my invention, what I claim as new and desire to secure by Letters Patent is:

1. In a device of the character described, a vehicle framework provided with a runway having a flat portion and a downwardly sloping portion, a hopper having an inclined front wall and a flat portion conforming to the flat portion of said runway, said hopper being adapted to roll automatically down the sloping portion of said runway to discharge position, and an abutment having an inclined face conforming to the inclined front wall of said hopper, said flat portions and said inclined portions coöperating to provide a substantial support for said hopper while in normal position.

2. A device of the character described, comprising a vehicle framework, a one way dumping hopper mounted on said framework and a runway along which said hopper is adapted to roll, said runway having pivot means at the end thereof, said framework being provided with a support upon which the bottom of said hopper rests in normal load carrying position and said hopper having a bottom of substantial area and having a portion adapted to coöperate with a portion of said runway as said hopper leaves said support with a tilting movement and rolls to discharge position, and said support being shaped substantially to conform to the shape of said hopper bottom to provide a substantial support for said hopper when in load carrying position, said hopper being so constructed that the same has a tendency when loaded to roll substantially automatically from load carrying toward discharge position with a final pivotal discharge movement about said pivot means.

3. A device of the character described including a dropframe trailer framework, a removable rear dump hopper carried by said framework at its depressed portion, and a stationary body carried upon its raised portion, said framework having means for receiving and holding an express type body in place of said hopper.

4. A device of the character described including a dropframe trailer framework, a removable rear dump hopper carried by said framework at its depressed portion, and a stationary body carried upon its raised portion, said framework having means for receiving and holding an express type body in place of said hopper, the floor of said stationary body being in substantial alinement with the floor of said express type body when mounted in place.

5. A device of the character described including a dropframe trailer framework, a removable rear dump hopper carried by said framework at its depressed portion, a stationary body carried upon its raised portion, said framework having means for receiving and holding an express type body in place of said hopper, and an adjustable end wall for said stationary body adapted in its alternative position to be alined with the floor of said stationary body.

6. A device of the character described including a trailer framework, and a removable rear dump hopper carried by said framework, said framework having means for receiving and holding an express type body in place of said hopper.

7. A device of the character described comprising a vehicle framework, said framework being provided with a substantially flat support, a one-way dumping hopper mounted on said framework and a runway along which said hopper is adapted to roll, said hopper having a substantially flat portion conforming to said flat support and resting thereon in normal load carrying position and having a portion adapted to coöperate with an inclined portion of said runway when said hopper rolls to discharge position, said hopper being so constructed that the same has a progressively increasing tendency when loaded to roll substantially automatically from load carrying to discharge position as the same moves from load carrying to discharge position.

8. A device of the character described including a dropframe framework, and an express type body carried thereby having its floor substantially in alinement with the raised portion of said framework.

9. A device of the character described including a dropframe framework having a sloping upper surface at its depressed portion, an express type body carried thereby, and a filler interposed between said framework and said body.

10. A device of the character described including a dropframe framework, and an express type body carried thereby having its floor substantially in alinement with the raised portion of said framework, there being a material receiving space between said floor and said framework.

11. A device of the character described including a dropframe framework having a sloping upper surface at its depressed portion, an express type body carried thereby, and a filler interposed between said framework and said body, there being a material receiving space between said floor and said framework.

12. A device of the character described including a drop-frame framework, an express type body carried thereby having its floor substantially in alinement with the raised portion of said framework, and an auxiliary body carried by said framework at its raised portion.

13. A device of the character described including a drop-frame framework having a sloping upper surface at its depressed portion, an express type body carried thereby, a filler interposed between said framework and said body, and an auxiliary body carried by said framework at its raised portion.

14. A device of the character described including a drop-frame framework, an express type body carried thereby having its floor substantially in alinement with the raised portion of said framework, there being a material receiving space between said floor and said framework, and an auxiliary body carried by said framework at its raised portion.

15. A device of the character described including a dropframe framework having a sloping upper surface at its depressed portion, an express type body carried thereby, a filler interposed between said framework and said body, there being a material receiving space between said floor and said framework, and an auxiliary body carried by said framework at its raised portion.

In witness whereof I hereunto subscribe my name this 23rd day of April, A. D. 1919.

ALBERT P. LEE.